US008935422B1

(12) United States Patent
Terleski et al.

(10) Patent No.: US 8,935,422 B1
(45) Date of Patent: Jan. 13, 2015

(54) EMBEDDED STREAMS USER INTERFACE

(75) Inventors: Jonathan Terleski, Mountain View, CA (US); Brynn Evans, San Francisco, CA (US)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 13/271,046

(22) Filed: Oct. 11, 2011

(51) Int. Cl.
G06F 15/16 (2006.01)

(52) U.S. Cl.
USPC .............................. 709/231; 709/203; 725/34

(58) Field of Classification Search
USPC ......................................................... 709/231
See application file for complete search history.

(56) References Cited

U.S. PATENT DOCUMENTS

| | | |
|---|---|---|
| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,106,848 B1 | 9/2006 | Barlow et al. |
| 7,366,990 B2 | 4/2008 | Pitroda |
| 7,555,110 B2 | 6/2009 | Dolan et al. |
| 7,610,287 B1 | 10/2009 | Dean et al. |
| 7,742,468 B2 | 6/2010 | Vagelos |
| 2002/0137490 A1 | 9/2002 | Gallant |
| 2002/0143874 A1 | 10/2002 | Marquette et al. |
| 2003/0066078 A1* | 4/2003 | Bjorgan et al. .................. 725/34 |
| 2004/0117444 A1* | 6/2004 | Goodman et al. ............ 709/204 |
| 2004/0258220 A1 | 12/2004 | Levine et al. |
| 2005/0152521 A1 | 7/2005 | Liljestrand |
| 2006/0026288 A1 | 2/2006 | Acharya et al. |
| 2006/0077957 A1 | 4/2006 | Reddy et al. |
| 2006/0206604 A1 | 9/2006 | O'Neil et al. |
| 2007/0127631 A1 | 6/2007 | Difiglia |
| 2007/0171898 A1 | 7/2007 | Salva |
| 2007/0173236 A1 | 7/2007 | Vishwanathan et al. |
| 2007/0248077 A1 | 10/2007 | Mahle, Jr. et al. |
| 2008/0056475 A1 | 3/2008 | Brannick et al. |
| 2008/0192656 A1 | 8/2008 | Vagelos |
| 2011/0098156 A1 | 4/2011 | Ng et al. |

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Hua Fan
(74) *Attorney, Agent, or Firm* — Patent Law Works LLP

(57) ABSTRACT

A system and method for providing or presenting secondary or embedded streams includes a primary stream generator, a secondary stream generator and a user interface engine. The primary stream generator generates the primary stream for the user and is coupled to a content source to extract data and coupled to provide the primary stream. The secondary stream generator generates a secondary stream for the user, is coupled to the content source to retrieve data and is coupled to provide the secondary stream. The user interface engine produces a user interface including a primary stream of content with an embedded secondary stream. The user interface engine is coupled to receive the primary stream from the primary stream generator and the secondary stream from the secondary stream generator. The present disclosure also includes a method for generating a user interface with an embedded stream.

26 Claims, 13 Drawing Sheets

(56) References Cited

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support"Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, pp. 252-255, London, United Kingdom.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Murchu et al., "Online Social and Business Networking Communities," Digital Enterprise Research Institute DERI Technical Report, National University of Ireland, Aug. 11, 2004, 22 pgs.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

\* cited by examiner

Generating embedded stream

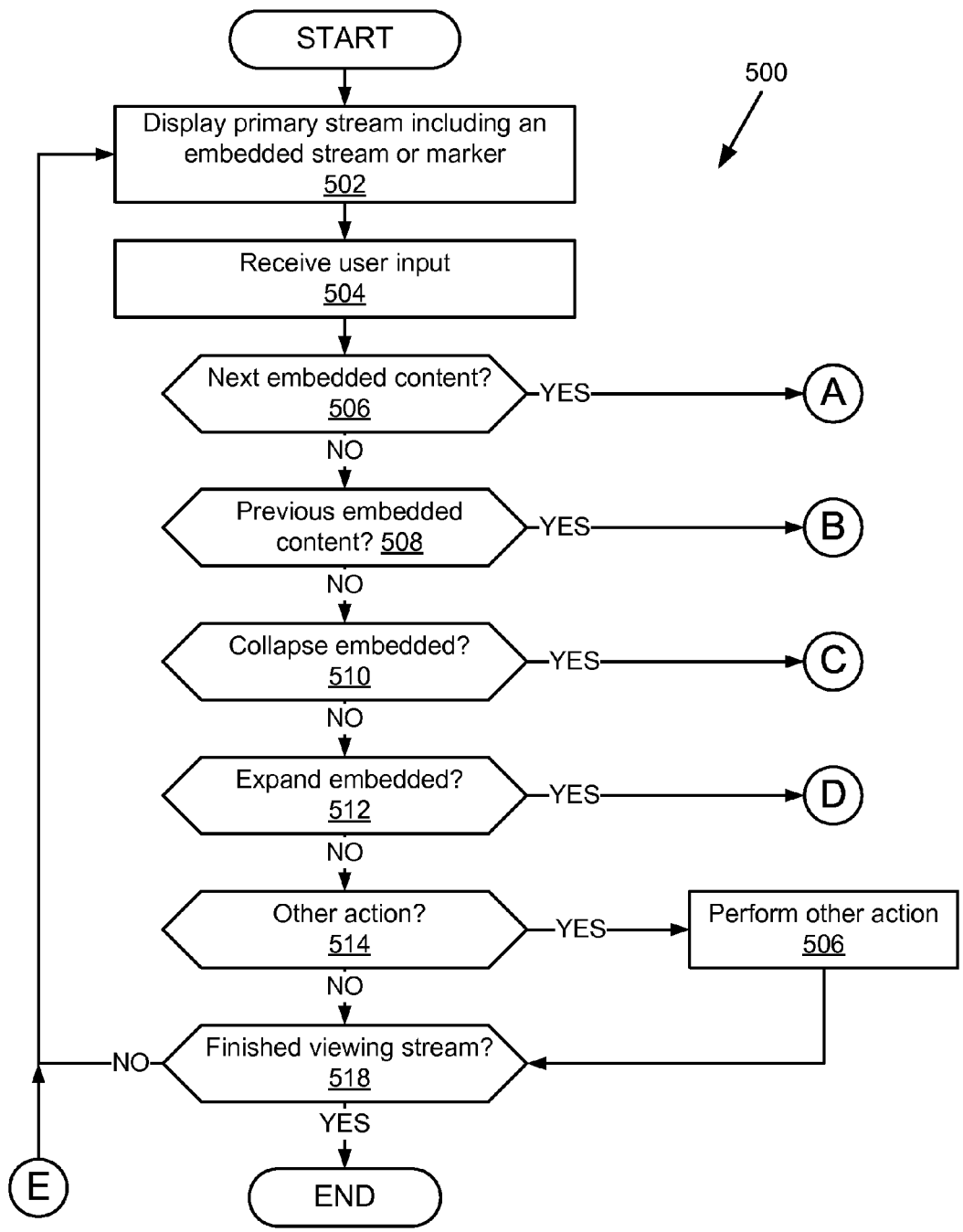
Figure 5A  Interacting w/ embedded stream

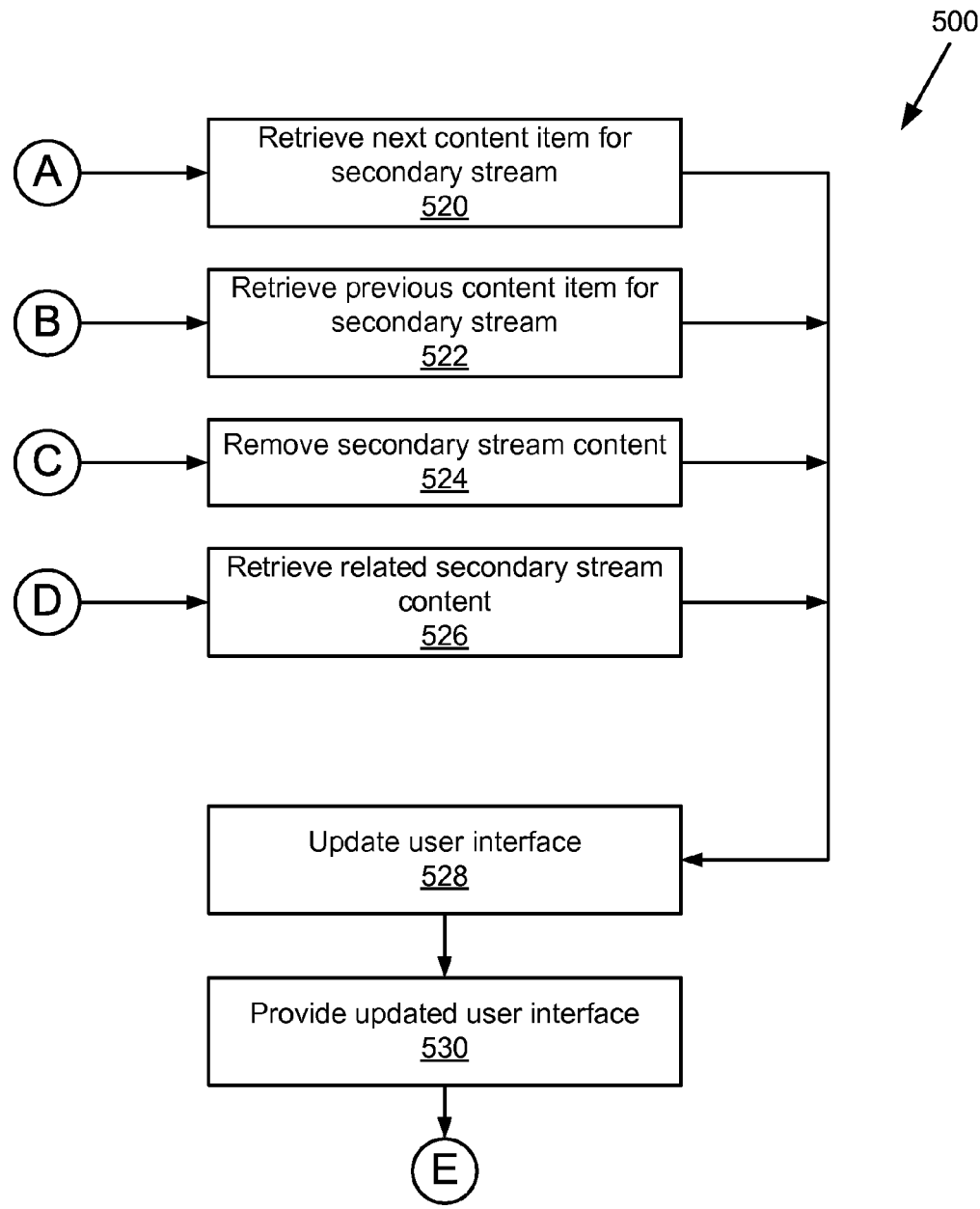
Figure 5B — Interacting w/ embedded stream (cont.)

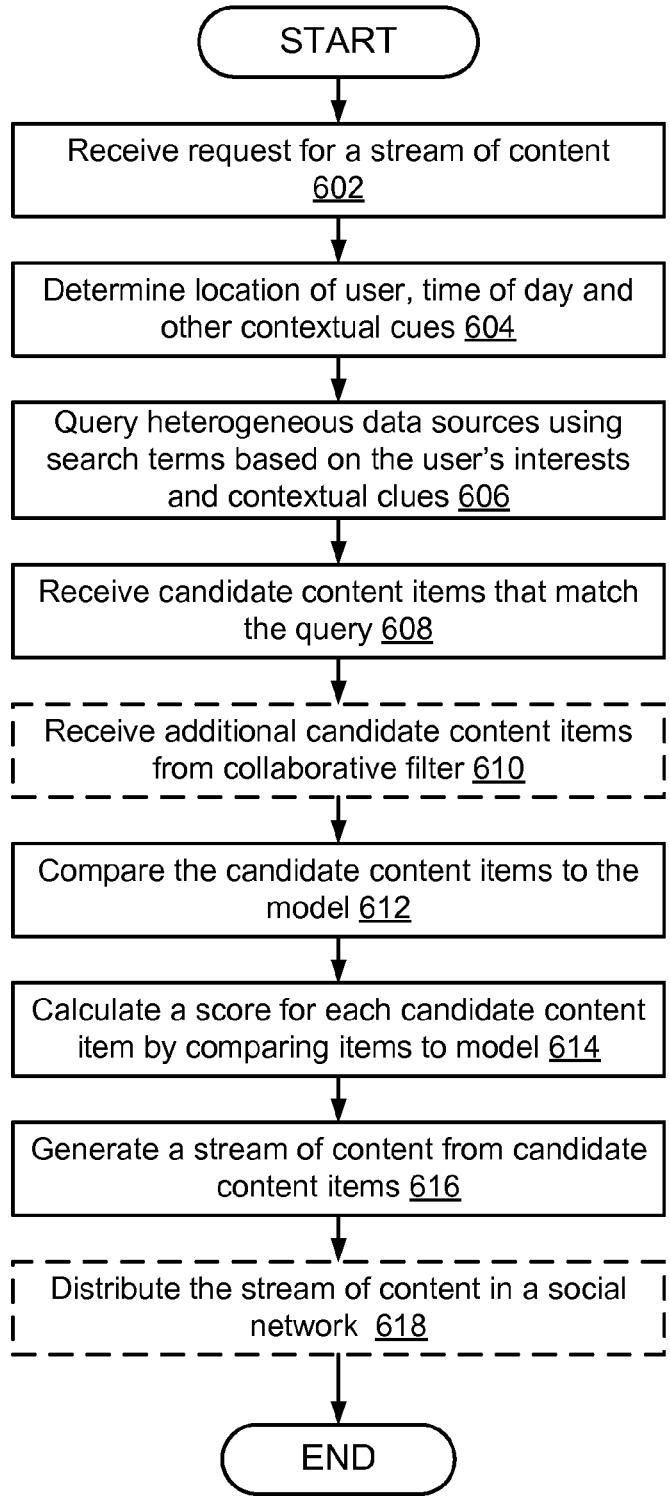
Figure 6    Creating a stream

Figure 8          Secondary expanded

Secondary collapsed

Secondary before & after

EMBEDDED STREAMS USER INTERFACE

BACKGROUND

The present disclosure relates to social networks and the presentation of content. In particular, the present disclosure relates to systems and methods for providing or presenting a primary stream and a secondary or embedded stream.

For some users the amount of content provided to them in social networks is limited or superficial and they are interested in learning more information about particular topics. For other users, the presentation of information is often about disparate topics or categories, types, groups, or users. The information is intermingled and it is difficult to find content related on one of these dimensions. Many such users are not using the social network to its full functionality because of these limitations. When the stream content becomes limited, users often leave the social network or use it less frequently or not all.

SUMMARY

The present disclosure overcomes the deficiencies and limitations of the prior art at least in part by providing a system and method for providing or presenting a primary stream with a secondary or embedded stream. An embodiment of the system comprises a primary stream generator, a secondary stream generator and a user interface engine. The primary stream generator generates the primary stream for the user and is coupled to a content source to extract data and coupled to provide the primary stream. The secondary stream generator generates a secondary stream for the user, is coupled to the content source to retrieve data and is coupled to provide the secondary stream. The user interface engine produces a user interface including a primary stream of content with an embedded secondary stream. The user interface engine is coupled to receive the primary stream from the primary stream generator and the secondary stream from the secondary stream generator. The present disclosure also includes a method for generating a user interface with an embedded stream including: determining a context of user interaction with a stream of content; determining content for a primary stream of content; determining content for a secondary stream of content; embedding the secondary stream into the primary stream; and providing a user interface including the primary stream and the embedded secondary stream for display to the user.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5A and 5B are a flowchart of a method for modifying a user interface in response to user input according to some embodiments of the present disclosure.

FIG. 6 is a flow diagram of a method for generating a stream of content according to some embodiments of the present disclosure.

DETAILED DESCRIPTION

Figure 1:
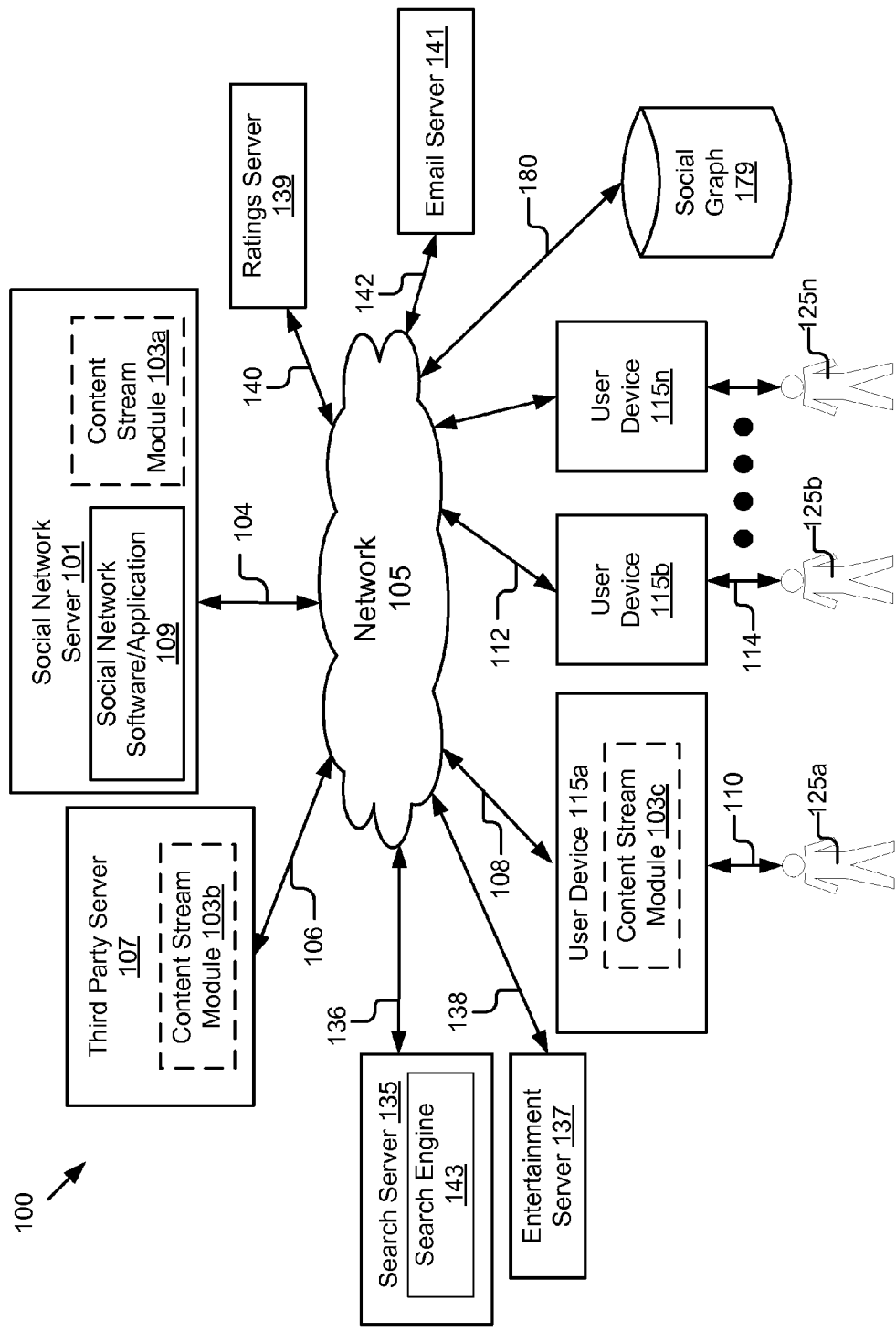
FIG. 1 is a block diagram illustrating an embodiment of a system for providing embedded streams according to some embodiments of the present disclosure.

FIG. 1 illustrates a block diagram of a system 100 for generating and providing a stream of content including an embedded or secondary stream according to some embodiments of the present disclosure. The system 100 for generating and providing a stream of content with an embedded stream comprises user devices 115a, 115b and 115n that are accessed by users 125a, 125b and 125n, a social network server 101 and a third party server 107. In the illustrated embodiment, these entities are communicatively coupled via a network 105.

The user devices 115a, 115b and 115n in FIG. 1 are used by way of example. While FIG. 1 illustrates three devices, the present disclosure applies to any system architecture having one or more user devices. Furthermore, while only one network 105 is coupled to the user devices, 115a, 115b and 115n the social network server 101 and the third party server 107, in practice any number of networks 105 can be connected to the entities. Furthermore, while only one third party server 107 is shown, the system 100 could include one or more third party servers 107.

In one embodiment, the content stream module 103a is operable on the social network server 101, which is coupled to the network 105 via signal line 109. The social network server 101 also contains a social network software/application 109. Although only one social network server 101 is shown, it should be understood that multiple servers may be present. A social network is any type of social structure where the users are connected by a common feature, for example Google+. The common feature includes friendship, family, work, an interest, etc. The common features are provided by one or more social networking systems, such as those included in the system 100, including explicitly-defined relationships and relationships implied by social connections with other online users, where the relationships form a social graph. In some examples, the social graph 179 can reflect a mapping of these users and how they are related.

In another embodiment, the content stream module 103b is stored on a third party server 107, which is connected to the network 105 via signal line 106. In yet another embodiment, the content stream module 103c is stored on a user device 115a, which is connected to the network 105 via signal line 108. The user 125a interacts with the user device 115a via signal line 110. Similarly, the user device 115b is coupled to the network 105 via signal line 112 and the user 125b interacts with the user device 115b via signal line 114. It should be understood that the content stream module 103 can be stored in any combination of devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The content stream module 103 receives data for generating a content stream and an embedded or secondary stream from heterogeneous data sources. In one embodiment, the content stream module 103 receives data from the third party server 107, the social network server 101, user devices 115a, 115b ... 115n, a search server 135 that is coupled to the network 105 via signal line 136, an entertainment server 137 that is coupled to the network 105 via signal line 138, a ratings server 139 (e.g. for Google Hotpot or other ratings website) that is coupled to the network 105 via signal line 140, an email server 141 that is coupled to the network 105 via signal line 142 and the social graph 179 that is coupled to the network 105 via signal line 180. In one embodiment, the search server 135 includes a search engine 143 for retrieving results that match search terms from the Internet. In one embodiment, the search engine 143 is powered by Google®. The content stream module 103 generates a model based on the data from the heterogeneous data sources, receives candidate content items from heterogeneous data sources, compares the candidate content items to the model and generates a stream of content.

Content Stream Module 103

Figure 2:
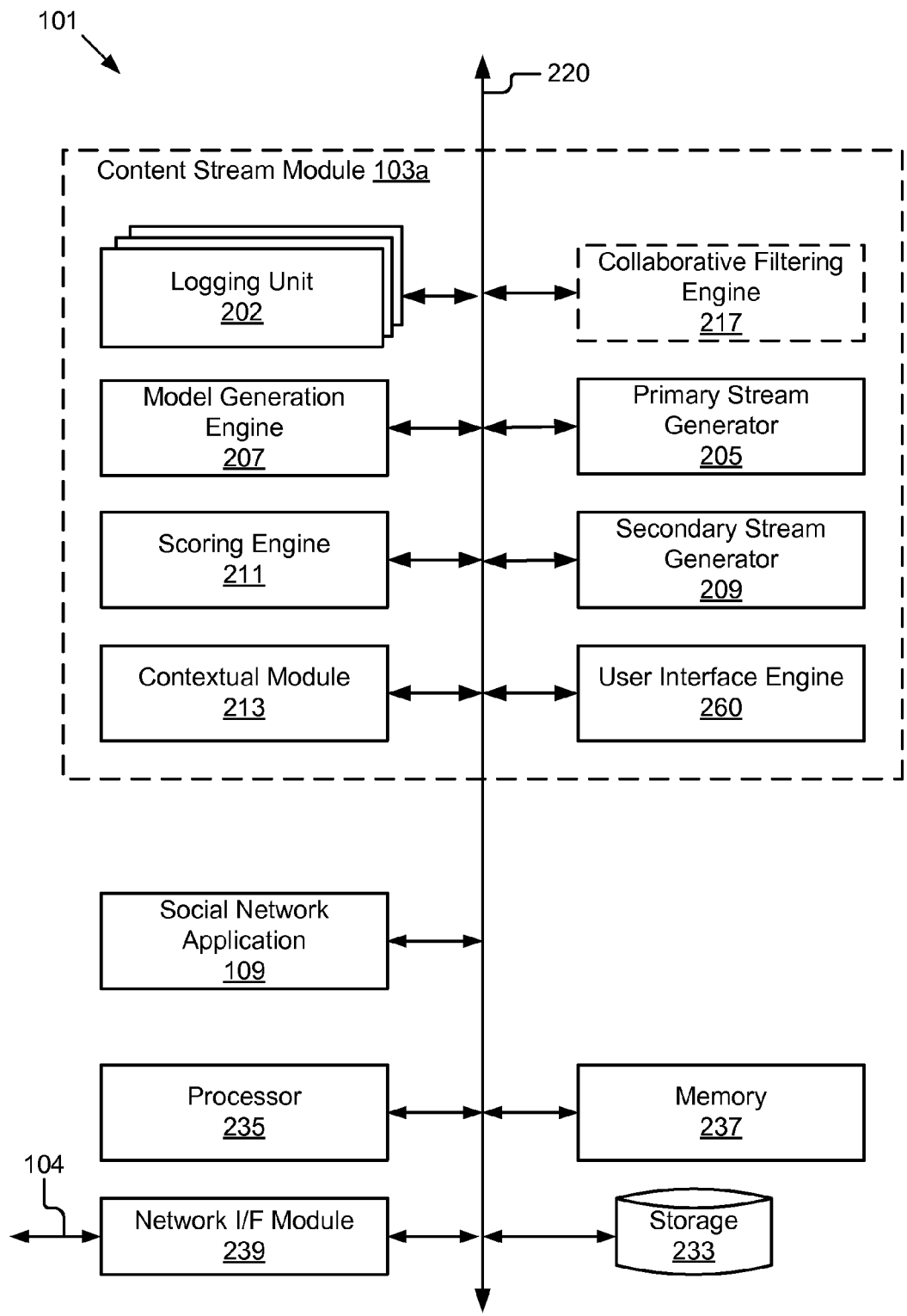
FIG. 2 is a block diagram illustrating a social network server including an content stream module for providing embedded streams according to some embodiments of the present disclosure.

Referring now to FIG. 2, the content stream module 103 is shown in more detail. FIG. 2 is a block diagram of the social network server 101. The social network server 101 comprises: the content stream module 103a, the social network application 109, a processor 235, a memory 237, a network interface (I/F) module 239 and storage 233. While the content stream module 103a will be described in the context of operating as part of the social network server 101, it should be understood that the content stream module 103b, 103c is operable as part of the third party server 107, the user device 115 or other components of system 100.

The processor 235 comprises an arithmetic logic unit, a microprocessor, a general purpose controller or some other processor array to perform computations and provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The network interface (I/F) module 239 is coupled to network 105 by signal line 109 and coupled to the bus 220. The network interface module 239 includes ports for wired connectivity such as but not limited to USB, SD, or CAT-5, etc. The network interface module 239 links the processor 235 to the network 105 that may in turn be coupled to other processing systems. The network interface module 239 provides other connections to the network 105 using standard network protocols such as TCP/IP, HTTP, HTTPS and SMTP. In other embodiments, the network interface module 239 includes a transceiver for sending and receiving signals using Wi-Fi, Bluetooth® or cellular communications for wireless communication.

In one embodiment, the storage 233 stores data, information and instructions used by the social network server 101. Such stored information includes information about users, messages, posts, photos, streams, and other information. The storage 233 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage 233 is coupled by the bus 220 for communication with other components of the social network server 101.

The social network application 109 is software or routines operational on the social network sever 101 for implementing a social network structure as has been described above. The social network application 109 maintains records of a user's interests, friends, and provides an area in which to post messages, photos, videos and other content. The social network application 109 also processes interactions with the social network and other systems. Using those interactions and information, social network presents a stream of content that is tailored to the interests of the user. This stream of content can include messages, photos, videos web pages and other content from other users and friends of the user. The social network application 109 is coupled to the bus 220 for communication with the network interface module 239, the processor 235, the memory 237, the storage 233 and the content stream module 103.

In one embodiment, the content stream module 103 comprises a logging unit 202, a model generation engine 207, a scoring engine 211, a contextual module 213, optionally, a collaborative filtering engine 217, a primary stream generator 205, a secondary or embedded stream generator 209 and a user interface engine 260.

The logging unit 202 is software including routines for receiving information about a user's interests and social connections (subject to the user opting into data collection) and for generating a log. In one embodiment, the logging unit 202 is a set of instructions executable by the processor 235 to provide the functionality described below for generating the log. In another embodiment, the logging unit 202 is stored in the memory 237 of the computing device 200 and is accessible and executable by the processor 235. In either embodiment, the logging unit 202 is adapted for cooperation and communication with the processor 235 and other components of the social network server 101 via bus 220.

The logging unit 202 obtains information about users across a range of heterogeneous data sources including search (such as web, video, news, maps, alerts), entertainment (such as news, video, a personalized homepage, blogs, a reader, gadget subscriptions), social activity (such as interactions through email, profile information, text messaging such as short message service (SMS), Google Buzz, geographical locations, comments on photos, a social graph and other social networking information) and activity on third-party sites (such as websites that provide ratings, reviews and social networks where users indicate that they approve of content). This information is derived, for example, from a user's search history, browsing history and other interactions with the Internet. The logging unit 202 generates a log from the information. The log contains the received information and a designation of the source of the information.

In one embodiment, there are multiple logging units 202 that each receive data from a different heterogeneous data source. In another embodiment, the data is received by the same logging unit 202. The logging unit 202 transmits the log to memory 237 or storage 233 for storage. In one embodiment, the memory 237 partitions the logs from each heterogeneous data source in a separate data storage location. In another embodiment, the data from heterogeneous data sources is stored in the same location in the memory 237. In yet another embodiment, the memory 237 partitions the model and the stream of content into separate storage locations as well.

The model generation engine 207 is software including routines for retrieving the log from the memory 237 and generating a model based on the log. In one embodiment, the model generation engine 207 is a set of instructions executable by the processor 235 to provide the functionality described below for generating the model. In another embodiment, the model generation engine 207 is stored in the memory 237 of the computing device 200 and is accessible and executable by the processor 235. In either embodiment, the model generation engine 207 is adapted for cooperation and communication with the processor 235 and other components of the social network server 101 via bus 220.

The model generation engine 207 receives user information from a variety of sources including, for example, queries, clicks, news clicks, gadgets, email interactions, etc., extracts features from the information and generates a model based on the extracted features. The model include various types of relevance of items to users, along with floating point values to indicate the extent to which the relevance holds. Examples include liking a source, a primary location, and a list of interests. The interests are generated from explicit information and inferred information. Explicit information is derived, for example, from a user's list of interests on a social network or indicating that they liked a particular content item. Inferred information takes into account a user's activities.

The model generation engine 207 will infer that a user is interested in a particular subject, for example, if the subject matter appears in search terms. For example, the model generation engine 207 infers that a user who searches for information about different types of butterflies is interested in butterflies. If the user also searches for hiking equipment, the model generation engine 207 further infers that the user is interested in outdoor activities, such as nature walks and visiting parks. If the user subscribes to a blog about cooking, the model generation engine 207 infers that the user is interested in cooking. If the user clicks on Artist X articles in Google News, the model generation engine 207 infers that the user is interested in pop music. If the user repeatedly uses a mapping application to obtain directions to a fast food restaurant, the model generation engine 207 infers that the user is interested in the fast food restaurant. If the user plays chess using a chess gadget, the user is interested in chess. If the user subscribes to a "Best of Boxing" YouTube channel, the model generation engine 207 infers that the user is interested in boxing. The model generation engine 207 can even infer information based on the user's friend's activities. For example, content items that interest the user's friends might also interest the user. As a result, in one embodiment, the model includes the user's friends' interests.

In one embodiment, the model generation engine 207 also generates a model that includes several pieces of global meta-information about the user's consumption patterns including how frequently the user consumes the stream of content and global statistics on how likely the user is to reshare various types of items. Lastly, the model includes a sequence of weights and multipliers that are used to make predictions about the user's likelihood of clicking on, sharing or otherwise engaging with stream items.

The model generation engine 207 generates the model from the logs across the heterogeneous data sources. In one embodiment, the model generation engine 207 builds extensions to the model that employ the patterns of behavior of other users. For example, the model predicts the user's behavior based on the reaction of similar users. All the data that is derived from other users is anonymized before it is incorporated into the model.

In one embodiment, the model generation engine 207 generates a model in response to a user opting in with a specific piece of information, for example, allowing the model generation engine 207 to include the user's search history or third party accounts into the model. Alternatively, the model generation engine 207 receives periodic updates (one hour, one day, one week, etc.) from the heterogeneous data sources and in turn updates the model.

In yet another embodiment, the model generation engine 207 generates a model each time the user requests a stream of content. The advantage of this method is that the newest updates are included and the model is current. The disadvantage is that generating the model and then comparing the candidate content items to the model to generate the stream of content takes more time than comparing the candidate content items to a pre-existing model. The model generation engine 207 transmits the model to memory 237 or storage 233 for storage.

The contextual module 213 is software including routines for identifying contextual clues from a request for a content stream. In one embodiment, the contextual module 213 is a set of instructions executable by the processor 235 to provide the functionality described below for identifying contextual clues. In another embodiment, the contextual module 213 is stored in the memory 237 of the computing device 200 and is accessible and executable by the processor 235. In either embodiment, the contextual module 213 is adapted for cooperation and communication with the processor 235 and other components of the social network server 101 via bus 220

The contextual module 213 receives a request for a stream of content from a website or an application each time the user visits the website or activates an application that includes the content stream module 103. In another embodiment, the user requests the stream of content. In either case, the contextual module 213 receives the request and determines contextual clues from the request. For example, the contextual module 213 determines the location of the user (based, for example, on the user's IP address), the time of day and any other contextual clues. The contextual module 213 transmits the contextual clues to the scoring engine 211 via the bus 220.

The scoring engine 211 is software including routines for generating a stream of content from candidate content items. In one embodiment, the scoring engine 211 is a set of instructions executable by the processor 235 to provide the functionality described below for generating a stream of content. In another embodiment, the scoring engine 211 is stored in the memory 237 of the computing device 200 and is accessible and executable by the processor 235. In either embodiment, the scoring engine 211 is adapted for cooperation and communication with the processor 235 and other components of the social network server 101 via bus 220.

In one embodiment, the scoring engine 211 queries heterogeneous data sources for candidate content items related to search terms, receives the candidate content items and compares the candidate content items to the model to determine whether the user would find the candidate content items interesting. The heterogeneous data sources include a search engine 143, an entertainment server 137, an email server 141, a ratings server 139, a social network server 101 and a third party server 107.

The query is derived from the user's interests, social connections and, in one embodiment, recent search terms input by the user. In one embodiment, the scoring engine 211 also uses contextual clues transmitted from the contextual module 213 to further narrow the number of candidate content items. For example, the scoring engine 211 queries the search engine 143 for items related to skiing because it is an explicit interest, sports car because it is a recent search term and sports car and skiing in Montana because the user's IP address is in Montana.

In one embodiment, the scoring engine 211 first performs the query and then compares the results to the model to determine whether the user would find them interesting. In another embodiment, these steps are performed simultaneously. In yet another embodiment, the scoring engine 211 compares candidate content items to the model and then filters the results according to the subject matter of the queries.

The scoring engine 211 determines interestingness based on social relevance and an interest match of the item to the user. Social relevance refers to whether a content item is new and determined to be valuable by people of a similar demographic to the user. For example, if the user is 13 and enjoys pop music, the user might be interested in content items about a new artist named Artist X. The interest match of the item to the user is determined based on similarity of the content item to the model.

The interestingness is measured by calculating a score for each candidate content item. In one embodiment, the scoring engine 211 incorporates historical interaction feeds into the scoring. In one embodiment, the candidate items are not displayed unless their candidate scores exceed a certain threshold. Once the scores are calculated and thresholds are exceeded, the scoring engine 211 generates a stream of content that is ordered according to the candidate content item scores. In one embodiment, the scoring engine 211 generates a user interface that includes the stream of content. The user interface is displayed as part of another application, such as a social network, or as its own standalone application.

In one embodiment, the scoring engine 211 also generates an explanation for each item in the stream of content. The explanation is presented in a variety of ways including a tag that contains the subject matter of the content item (skiing) or a more detailed explanation (your friends enjoyed this article). Other explanations include that the content item matches a specific user interest or is similar to other content items that the user has liked in the past. The user's reaction to the explanation is used to further refine the model. This process is discussed in more detail below in connection with FIG. 3, which illustrates a more detailed block diagram of the scoring engine 211.

In one embodiment, the model contains two levels: (1) explicit user interests that are displayed to the user as explanations for generating a particular content item; and (2) a mathematical model that is not displayed to the user. The second level is used for scoring and more complicated analysis of subject matter. For example, a content item is described in the first level as relating to bicycling. In the second layer, the model generation engine 207 identifies the user as being most interested in competitive mountain biking.

The collaborative filtering engine 217 is software including routines for generating additional candidate content items through collaborative filtering and transmitting the additional candidate content items to the scoring engine 211 that were derived from collaborative filtering. In one embodiment, the collaborative filtering engine 217 is a set of instructions executable by the processor 235 to provide the functionality described below for generating additional candidate content items. In another embodiment, the collaborative filtering engine 217 is stored in the memory 237 of the computing device 200 and is accessible and executable by the processor 235. In either embodiment, the collaborative filtering engine 217 is adapted for cooperation and communication with the processor 235 and other components of the social network server 101 via bus 220.

The collaborative filtering engine 217 obtains candidate content items that are socially relevant from a stream of content derived from people with whom the user has a relationship and transmits the candidate content items to the scoring engine 211. For example, the stream of content is derived from friends in a social network or people that the user frequently emails. The more important that the person appears to be to the user, the more likely that the user will be interested in the content item. Thus, in one embodiment, the collaborative filtering engine 217 applies a weight to candidate content items based on the social relationship of the user to the friend. For example, users that are friends receive higher weights than candidate content items from second generation friends of the user (i.e. a friend of a friend).

Even if the user is not interested in the item, the user may read the item because he knows it is important to the other person. For example, if the user's parent is researching assisted living homes, the user will want to become informed about the homes, even though the information is not interesting, per se. The information is still relevant.

In another embodiment, the collaborative filtering engine 217 selects candidate items based on shared similarities between users. For example, if the user has children, the collaborative filtering engine 217 selects candidate content items from other users that also have children.

The collaborative filtering engine 217 increases the weights applied to candidate content items from friends when the user positively responds to the items. For example, if the user comments on the item or indicates that the user found the item interesting, the collaborative filtering engine 217 increase the weight so that more candidate content items from the friend become part of the stream of content.

The primary stream generator 205 is software, code or routines for generating a primary stream for a user. The primary stream generator 205 is coupled to bus 220 to receive a stream or stream data for a user from the scoring engine 211. The primary stream generator 205 is also coupled by the bus 220 to provide the primary stream to the user interface engine 260. The primary stream is a stream of content adapted for the user based on a request, location, user interests, friends or other factors as has been described above for the scoring engine 211.

The secondary or embedded stream generator 209 is software, code or routines for generating a secondary stream for a user. The terms "secondary stream" or "embedded stream" are used interchangeably throughout this specification to refer to the same thing. The secondary stream is inserted into the primary stream as an item of content as will be described in more detail below. The secondary stream is a stream of content to provide more information about a particular topic, category, subject, group, person etc. In some embodiments, the content items in the primary stream are used by the secondary stream generator 209 to produce one or more secondary streams. The secondary or embedded stream generator 209 is coupled by bus 220 to the scoring engine 211 to receive a stream or stream data for an item of content in the primary stream of a user. The secondary or embedded stream generator 209 cooperates with the scoring engine 211 to generate such secondary streams. The secondary stream generator 209 is also coupled by the bus 220 to provide the secondary stream to the user interface engine 260.

The user interface engine 260 is software including routines for generating a user interface that displays the stream of content, receives user feedback and allows the user to add or remove explicit interests. In one embodiment, the user interface engine 260 is a set of instructions executable by the processor 235 to provide the functionality described below for generating a stream of content. In another embodiment, the user interface engine 260 is stored in the memory 237 of the computing device 200 and is accessible and executable by the processor 235. In either embodiment, the user interface engine 260 is adapted for cooperation and communication with the processor 235 and other components of the social network 101 via the bus 220. In some embodiments, the user interface engine 260 receives the primary stream from the primary stream generator 205 and one or more secondary streams from the secondary stream generator 209 and combines the streams into to a user interface with embedded streams. The operation of the content stream module 103 and the user interface engine 260 is described in more detail below with reference to FIGS. 4-6.

The stream of content is displayed in a user interface that allows the user to share the item with friends, comment on the item, save the item, etc. By sharing the content items with friends, the stream of content is circulated throughout the social network. In one embodiment, the scoring engine 211 automatically distributes content items to friends based on a determined commonality, such as sharing pictures of the user's friends with all family members. As a result, a user's stream becomes a combination of information retrieved from websites and content obtained through friends. This keeps the content interesting and the results fresh.

Figure 3:
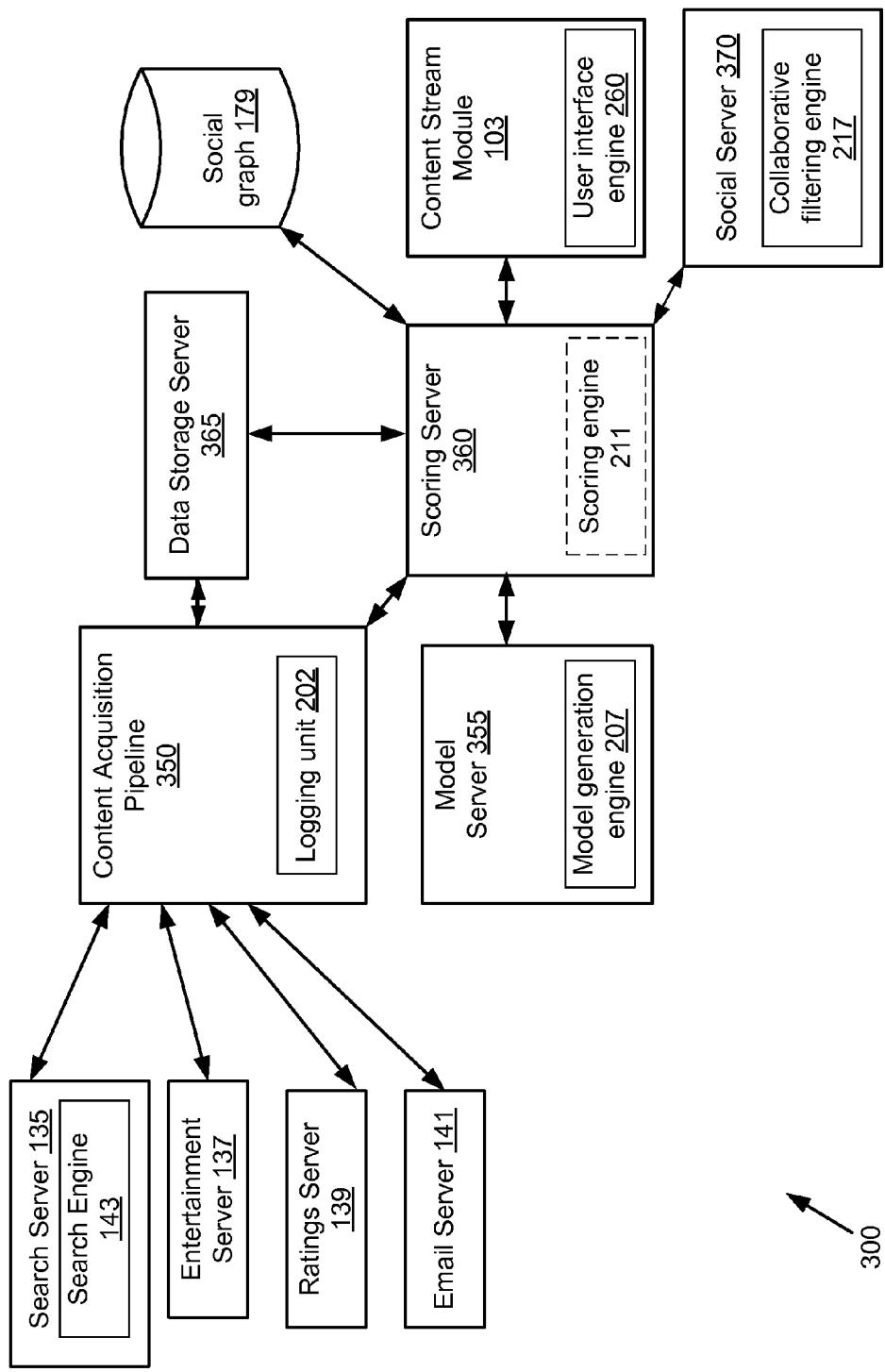
FIG. 3 is a block diagram of a system for generating a stream of content according to some embodiments of the present disclosure.

FIG. 3 is a high-level block diagram illustrating another embodiment of a system 300 for generating a stream of content including embedded or secondary content. In this embodiment, the components of the content stream module 103 are divided among various servers so that the information is efficiently processed. The system 300 includes the search server 135, the entertainment server 137, the ratings server 139, the email server 141, a content acquisition pipeline 350, a data storage server (big table) 365, a model server 355, a scoring server 360, the social graph 179, a social server 370 and the content stream module 103.

The heterogeneous data sources (search server 135, entertainment server 137, ratings server 139 and email server 141) are crawled by a content acquisition pipeline 350 or are directly transmitted to the content acquisition pipeline 350.

The content acquisition pipeline 350 includes a logging unit 202 for annotating the content items with specific tags, such as features and a global score and generating logs of user activities. Once the content items are annotated, the logging unit 202 transmits the data to the data storage server 365. The data storage server 365 indexes the features of each content item and stores them in at least one database. In one embodiment, the content items are organized according to an identification format (SourceType#UniqueItemID, for example, "YOUTUBE#video_id" and "NEWS#doc_id"), an item static feature column that holds an item's static features (title, content, content classification, etc.), an item dynamic feature column that holds an item's dynamic features (global_score, number of clicks, number of following, etc.), a source (src) static feature column where the source is a publisher of an item (NY Times in news, video uploading in YouTube, etc.), a src dynamic feature column holds the source's dynamic features, a content column holds activities that were used to create activities and a scoring_feature holds a proto message that is used for user scoring.

In one embodiment, the data storage server 365 dynamically phases out the content items. For example, news items expire after 24 hours, videos expire after 48 hours and feeds are kept for 24 hours or only the 10 most recent items, whichever is larger.

The content acquisition pipeline 350 also transmits the content items to the scoring server 360 for a global user ranking. The global scores are transmitted from the scoring server 360 to the data storage server 365, which stores the global scores in association with the content items. The global scores are helpful for organizing the content items in the data storage server 365 according to the more popular items.

Turning now to the model server 355, the model server 355 receives the user activity from the logging unit 202 or the data storage server 365. The model generation engine 207 generates the model based on user input and/or prior actions. The model server 355 transmits a model to the scoring server 360 periodically or upon request.

In one embodiment, the scoring server 360 requests the model responsive to receiving a request for a stream of content from the content stream module 103. The scoring server 360 receives the model from the model server 355. The scoring server 360 requests and receives user candidates from the social graph 179. The scoring server 360 requests and receives candidate content items from the data storage server 365. The scoring server 360 requests and receives candidate content items from the social server 370. The candidate content items from the social server 370 are pre-scored and, in one embodiment, the unread candidate content items are saved to a cache on the social server 370. These items are saved to a cache because the quantity of social updates can be large enough that performing the scoring during write time enables faster reads.

The scoring engine 211 compares the candidate content items to the model and scores the candidate content items. In the case of candidate content items from the social server 370, the scoring engine 211 receives the candidate content items from the social server 370, compares the candidate content items to the model and rescores the candidate content items according to the model. The scoring engine 211 generates a stream of content based on the scored candidate content items and transmits the stream of content to the content stream module 103.

The content stream module 103 includes the user interface engine 260 that receives the streams of content from the scoring server 360 and displays it in a user interface. In addition to displaying the stream of content, the user interface provides the user with icons for changing the settings and user interests. The user interface provides buttons for interacting with the content in the streams as will be described in more detail below.

Methods

Figure 4:
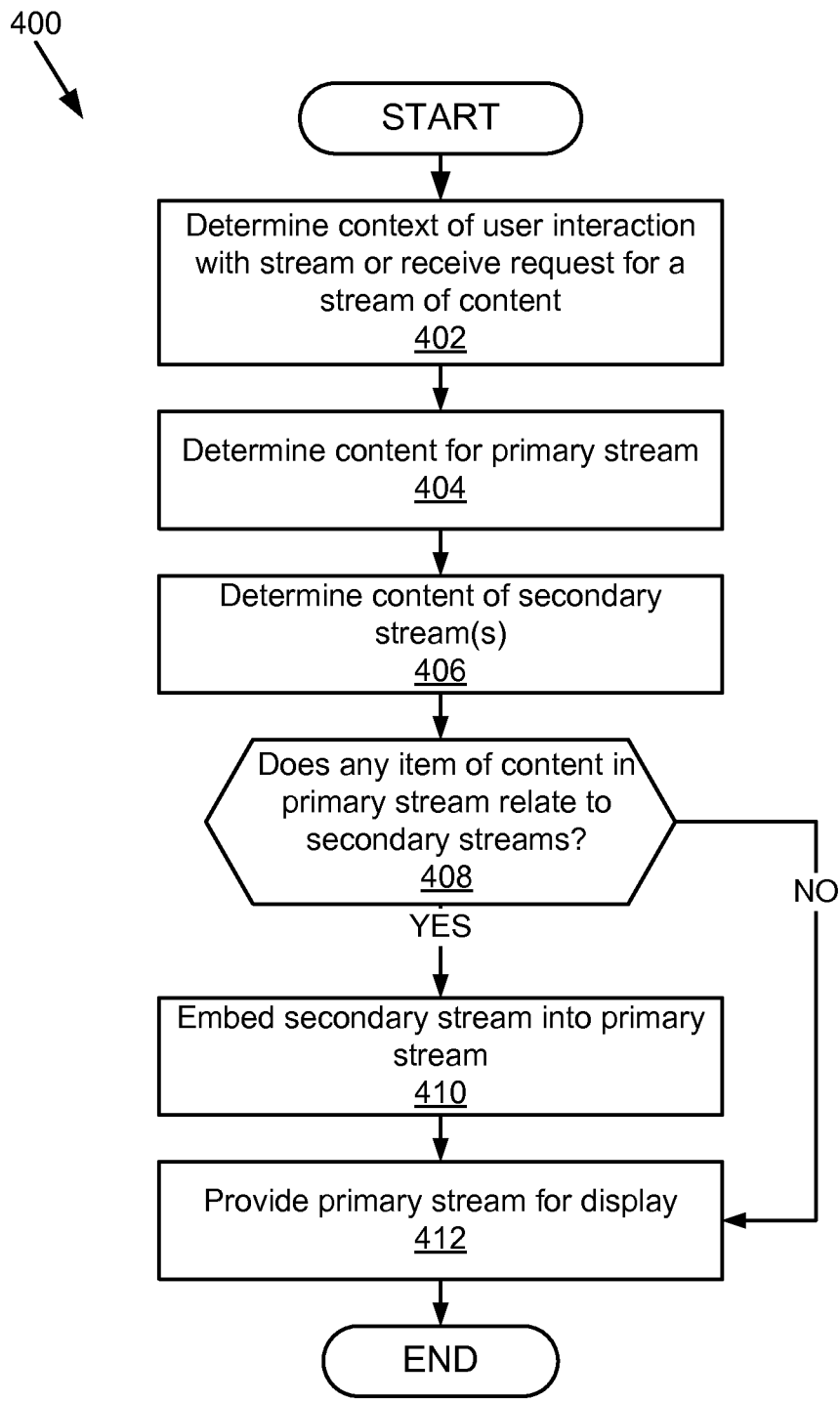
FIG. 4 is a flowchart of a method for generating an embedded stream according to some embodiments of the present disclosure.

Referring now to FIGS. 4-6, various embodiments of the methods of the present disclosure will be described. FIG. 4 is a flowchart of a method 400 for generating an embedded stream according to some embodiments of the present disclosure. The method 400 begins by determining 402 a context of user interaction with the stream. In some embodiments, the method 400 begins by receiving 402 a request for a stream of content. The method 400 continues by determining 404 the content for a primary stream. For example, the primary stream generator 205 cooperates with the scoring engine 211 to use information about the user (interest, location, friends from social graph, or other factors) to generate a primary stream of content. Then the method 400 determines content for one or more secondary streams of content. In some embodiments, the secondary stream generator 209 uses information about the user as well as content items that are in the primary stream of content to generate secondary streams of content. More specifically, if a particular item of content is in the primary stream and is of high interest to the user, the secondary stream generator 209 cooperates with the scoring engine 211 to retrieve additional content items that provide more detail about the particular item of content. In some embodiments, step 406 may not produce any secondary streams. In other embodiments, step 406 generates secondary streams on various items of content independent from the content in the primary stream. Next the method 400 determines 408 whether any item of content in the primary stream relates to the secondary streams. If not, the method 400 does not embed any of the secondary streams into the primary stream and continues in step 412. On the other hand, if there is an item of content in the primary stream relates to one of the secondary streams, one or more secondary streams are embedded 410 into the primary stream. In some embodiments, there is a limit to the number secondary streams that are embedded into the primary stream. This limit may be an absolute threshold or maybe adjusted based on user interest, relatedness, popularity as well as other factors. After either step 410 or 408, the method 400 continues by providing the primary stream including any embedded secondary streams for display. For example, the content stream module 103 may send the primary stream including the embedded stream to the client device 115 for display to the user. The primary stream including the embedded stream is displayed in user interfaces as will be described below in more detail with reference FIG. 7-11B.

Referring now to FIGS. 5A and 5B, a method 500 for modifying a user interface in response to user input according to some embodiments of the present disclosure is described. The method 500 begins by displaying 502 a primary stream including an embedded or secondary stream or a marker for an embedded or secondary stream. For example, FIGS. 7, 8, 10, 11A and 11B show example user interfaces 700, 800, 1000 and 1100 with a primary stream and embedded secondary stream. FIG. 9 shows an example of a user interface 900 with a primary stream including a marker representing an embedded secondary stream. Then the method 500 receives 504 user input. The user interfaces 700, 800, 900, 1000 and 1100 provide a number of action buttons allowing the user to take particular action with regard to the secondary stream embedded in the primary stream. These actions will be described in more detail below with reference to FIGS. 7, 8, 10, 11A and 11B. Additionally, user interfaces 700, 800, 900, 1000 and 1100 provide a number of action buttons for performing other actions unrelated to the secondary stream. Then the method 500 proceeds to determine whether the input received in step 504 is to perform an action related to the secondary stream. It should be understood that in some embodiments the determinations made in steps 506, 508, 510, 512, and 514 could be performed in a variety of other orders.

The method 500 determines 506 whether the input was to retrieve a next item of content from the secondary stream. If so, the method 500 proceeds to step 520 of FIG. 5B as will described in more detail below. If not, the method 500 proceeds from step 506 to step 508. In step 508, the method 500 determines whether the input was to retrieve a previous item of content from the secondary stream. If so, the method 500 proceeds to step 522 of FIG. 5B as will be described in more detail below. If not, the method 500 proceeds from step 508 to step 510. In step 510, the method 500 determines whether the input was to collapse the embedded secondary stream from a window showing a content item to a marker representing the secondary stream. If so, the method 500 proceeds to step 524 of FIG. 5B as will be described in more detail below. If not, the method 500 proceeds from step 510 to step 512. In step 512, the method 500 determines whether the input was to expand a marker representing the secondary stream to a window showing a content item from the embedded secondary stream. If so, the method 500 proceeds to step 526 of FIG. 5B as will be described in more detail below. If not, the method 500 proceeds from step 512 to step 514.

Referring now also to FIG. 5B, the actions performed by the method 500 of the present disclosure are described in more detail. Based on one of the determinations made in steps 506 to 512, the method 500 performs a respective action in step 520 to 526. In step 520, the method 500 retrieves a next content item for the selected secondary stream. In some embodiments, such as that disclosed in FIG. 10 where there are three content items from the secondary stream, the user interface 1000 retrieves a next item of content and updates the display by retaining two of the three content items and replacing one content item by with the retrieved next item. For example, in the user interface of FIG. 10, the three content items are shifted to the left. In step 522, the method 500 retrieves a previous content item for a selected secondary stream. Again, in some embodiments such as that disclosed in FIG. 10 where there are three content items from the secondary stream, the user interface retrieves a previous item of content and updates the display by retaining two of the three content items and replacing one content item by with the retrieved previous item. For example, in the user interface of FIG. 10, the three content items are shifted to the right. In step 524, the method 500 removes the content for the secondary stream and the window, and replaces them with a marker similar to that shown in FIG. 9. In step 526, the method 500 replaces the marker shown in FIG. 9 with a window showing a content item from the secondary stream. After performance of step 520, 522, 524 or 526, the method 500 proceeds to update 528 the user interface and provide 530 the updated user interface for display. The updated user interface can be sent to the client device 115 or provided to another for system for display to the user. After step 530, the method 500 returns to step 502 of FIG. 5A.

In some embodiments, the method 500 can include additional actions that can be performed on the secondary stream or its content items. In such embodiments, method 500 includes an additional determination step and action step similar to steps 506-512 and 520-526 described above. For example, the next or previous content items from the secondary stream may be displayed with partial transparency in response to the user hovering over one of the selected buttons as will be described in more detail below with reference to FIGS. 11A and 11B. It should be understood that any action on the secondary stream or a content item of the secondary stream is within the scope of the present disclosure.

If the user has not input an action or command related to the secondary stream, the method continues from step 512 to step 514. In step 514, the method 500 determines whether the received user input was to perform another action related to the user interface. The other action could be an action relative to the primary stream or it could be an action related to the user interface in general. If the user input was action possible for the user interface, the method 500 performs 506 the other action before proceeding to step 518. For example, other actions possible within the user interface include: selecting any number of menus, sharing content, selecting the toolbar, performing a search, posting a comment, posting a photo, post and a video, starting a hangout, view and edit circles, starting a chat, starting this part, etc. If the user input was not an action that the user interface can perform, the method 500 proceeds directly to step 518. Finally, the method 500 determines 518 whether the user input was to stop viewing the stream. If not, the method 500 returns to step 502. If so, the method ends.

Referring now to FIG. 6, a method 600 for generating a stream of content according to some embodiments of the present disclosure is described. The contextual module 213 receives 602 a request for a stream of content. The request comes directly from a user, from a website or from an application. The contextual module 213 determines 604 a location of the user, a time of day and other contextual clues. The scoring engine 211 queries 606 heterogeneous data sources using search terms based on the user's interests and contextual clues, and receives 608 candidate content items that match the query. In one embodiment, the query is based on search terms that were previously submitted by the user. The candidate content items are retrieved from heterogeneous data sources that include, for example, news articles, tweets, blogs, videos, photos, posts on social networks, etc.

In one embodiment, the scoring engine 211 receives 610 additional candidate content items from the collaborative filtering engine 217. These items are derived from the content stream of anyone with whom the user has a relationship. The scoring engine 211 compares 612 the candidate content items to a model.

The scoring engine 211 calculates 614 a score for each candidate content item by comparing the item to the model to determine interestingness to the user. The scoring engine 211 generates 616 a stream of content from the candidate content items. The stream is based on the number of items that can be displayed in the space. In one embodiment, the score of all content items that appear in the stream of content also have to exceed a certain threshold. This ensures that less interesting content is not displayed in situations where there is not enough content to generate a complete stream.

In one embodiment, the scoring engine 211 distributes 618 the stream of content in a social network. The social network helps the stream of content remain fresh and interesting because it helps distribute the information. For example, a user comments on one of the items in the stream of content. The comment appears in the user's friend's stream of content. The user's friend then shares the original item with other friends. Thus, items in the stream of content are circulated throughout the social network.

Figure 7:
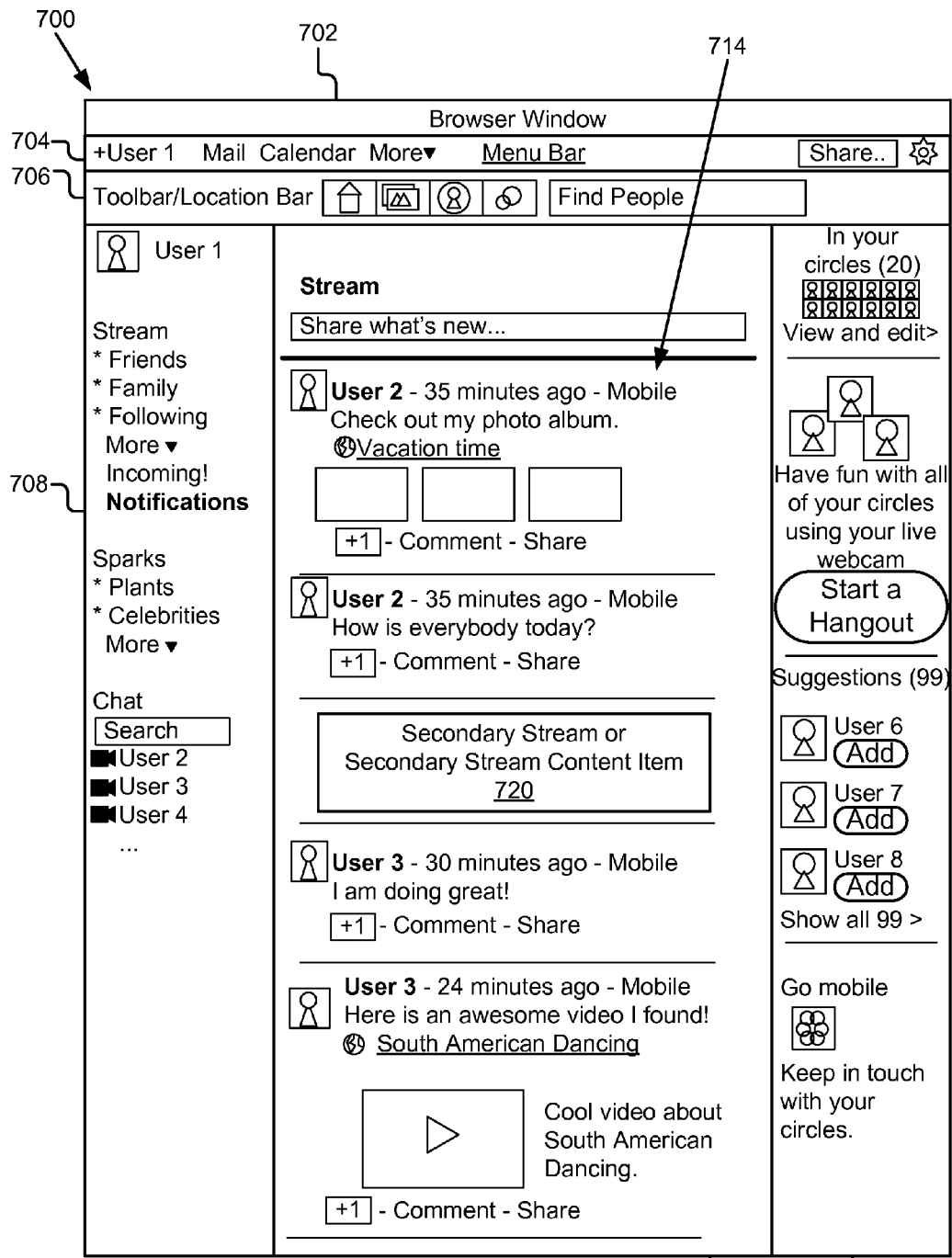
FIG. 7 is a graphic representation of a first embodiment of a user interface generated by the user interface engine of the present disclosure.

Referring now to FIG. 7, a first embodiment of a user interface 700 generated by the user interface engine 260 of the present disclosure is described. The first embodiment of the user interface 700 includes a browser window 702 having a number of components including a menu bar 704, a tool bar 706, a left sidebar 708, a display area 710 and a right side bar 712. Although not shown, the user interface 700 may include various other components of a conventional browser window such as an address bar, multiple tabs, etc. The menu bar 704 provides an area for user identification and menus for accessing other systems. The tool bar 706 provides icon for accessing different functions of a social network including a search box for finding other users. The left sidebar 708 provides a region for displaying a plurality of hypertext links to other streams, content feeds, notifications, chats and information about other user's on-line presence. The right side bar 712 includes other information about social networks such as groupings, video chat, and suggestions for other actions on the social network. The display area 710 of the user interface 700 includes a primary stream 714 with several messages or posts. The messages are posts each include identification of the author of the post, the time when was posted and the actual post or a digest of the post. Posts or messages can also include photos, videos or other files. Each post includes links to allow simple access for endorsement, commenting and sharing. The user interface 700 also shows one example secondary stream 720 that has been embedded into the primary stream of the user. In some embodiments, the secondary stream 720 is embedded into the primary stream 714. In other embodiments, and item of content from the secondary stream is embedded into the primary stream 714. Although the first embodiment of the user interface 700 only shows a single secondary stream 720 or secondary stream item, it should be understood that any number of secondary streams 720 could be embedded into the primary stream 714. In some embodiments, the present technology is particularly advantageous because the embedded secondary stream 720 or secondary stream content item have an appearance, form and size similar to any item of content in the primary stream 714.

Figure 8:
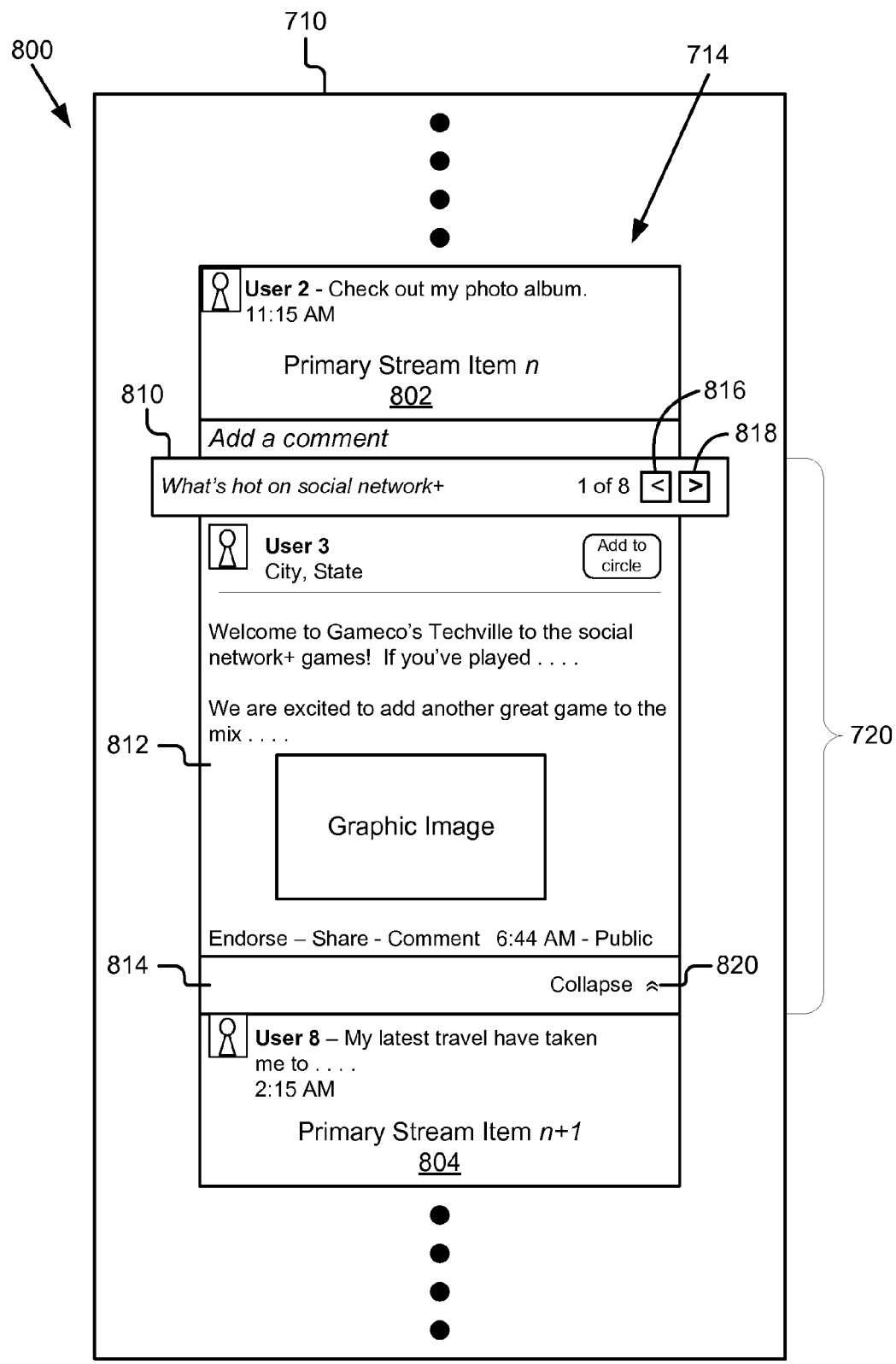
FIG. 8 is a graphic representation of a second embodiment of a user interface generated by the user interface engine of the present disclosure.
Figure 9:
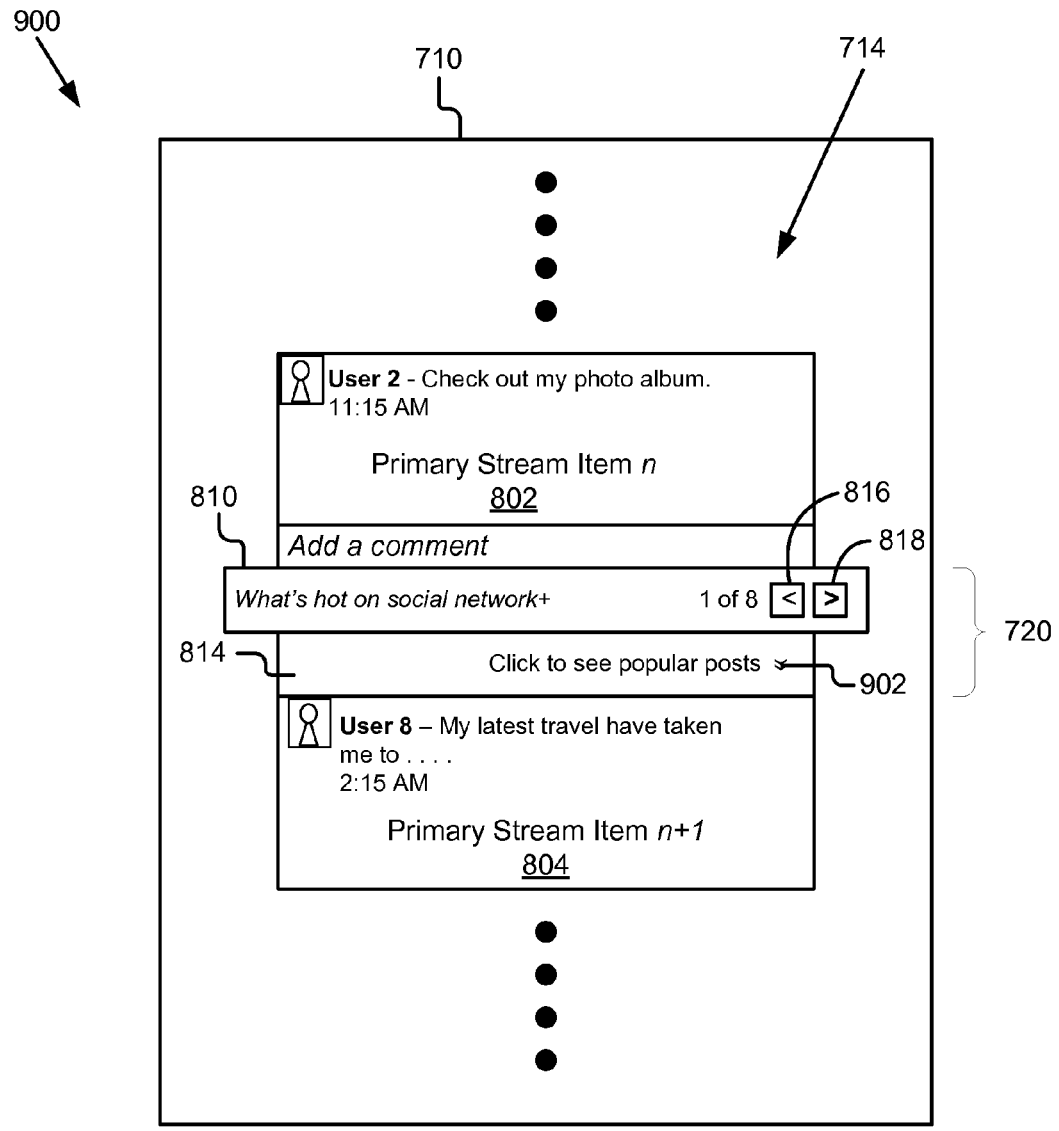
FIG. 9 is a graphic representation of a third embodiment of a user interface generated by the user interface engine of the present disclosure.

Referring now to FIG. 8, a second embodiment of a user interface 800 for presenting a secondary stream 720 within a primary stream 714 is shown. FIG. 8 shows a partial view of the second embodiment of the user interface 800 focusing on the display area 710 that presents the primary stream 714 and the embedded or secondary stream 720. Like reference numerals are used to refer to like components that have the same or similar functionality to that described above with reference to FIG. 7. The primary stream 714 includes a plurality of primary stream content items including primary stream item n 802 and primary stream item n+1 804. These primary stream items 802, 804 are merely two items out of many items that may be in the primary stream 714. The primary stream 714 includes an embedded secondary stream 720. Although only one secondary stream 720 is shown, it should be understood that the primary stream 714 may include any number of secondary streams 720. The secondary stream 720 includes a title rail 810, a secondary content display area 812 and a bottom rail 814. In some embodiments, the title rail 810 includes a descriptive label about the secondary stream 720, an indication of a sequence number for the content item shown in the secondary content display area 812, and control buttons 816, 818 to modify the content display area 812 to show a previous or next content item from the secondary stream 720. For example, the rail 810 of FIG. 8 has a label "What's hot on social network+". The secondary stream 720 includes eight content items and the content item being displayed in secondary content display area 812 is the first item of eight. In some embodiments, the title rail 810 has a visually distinct appearance from the other content items in the primary stream 714 to indicate to the user that it is a secondary stream. In this example, the title rail 810 has a width that is greater than the other content items in the primary stream 714. It should be understood that various other mechanisms such as shading, color, shape, or size can be used to present the title rail 810 in a visually distinct manner. The secondary content display area 812 includes a variety of information such as text, graphic images, links to videos, or any other content available from the stream. In some embodiments, the secondary content display area 812 includes information about a user such as their name, photo or location. In some embodiments, the secondary content display area 812 includes buttons that allow the user to take actions, for example, add individuals as friends or to a given group, endorse content, share content, comment on content, etc. The secondary content display area 812 may include other status information such as the time the content was posted or whether the content is public or private. The bottom rail 814 marks the end of this secondary stream 720. In some embodiments, the bottom rail 814 includes a collapse button 812 which when selected removes the secondary content display area 812 from being displayed. It should be understood that the bottom rail 814 is optional and omitted in some embodiments. The user interface 800 of FIG. 8 is particular advantageous because of the user is interested in learning more about the secondary stream 720, the user need only select button 816 or 818 and additional content about that secondary stream 720 will be presented in the secondary content display area 812. This is advantageous because the user is able to view the secondary content from the existing window and the same context with regard to the primary stream 714 without having to transition to a new window, new tab or other interface.

Referring now to FIG. 9, a third embodiment of a user interface 900 generated by the user interface engine 260 of the present disclosure is described. FIG. 9 shows a partial view of the third embodiment of the user interface 800 focusing on the display area 710 that presents the primary stream 714 and the embedded or secondary stream 720. Like reference numerals are used to refer to like components that have the same or similar functionality to that described above with reference to FIGS. 7 and 8. FIG. 9 shows the user interface 900 after the user has selected the collapse button 820 of FIG. 7. Once the collapse button 820 has been selected, the user interface 900 is as shown in FIG. 9. In FIG. 9, the secondary stream 720 does not include the secondary display area 812 but includes the top rail 810 and a bottom rail 814. The top rail 810 has a similar form and function as has been described above with reference to FIG. 8. However, the bottom rail 814 includes a descriptive label and an expand button 902. This user interface 900 is advantageous because in situations where screen real estate is limited, having the secondary stream content item omitted prevents the secondary streams from monopolizing the area for displaying the primary stream 714.

Figure 10:
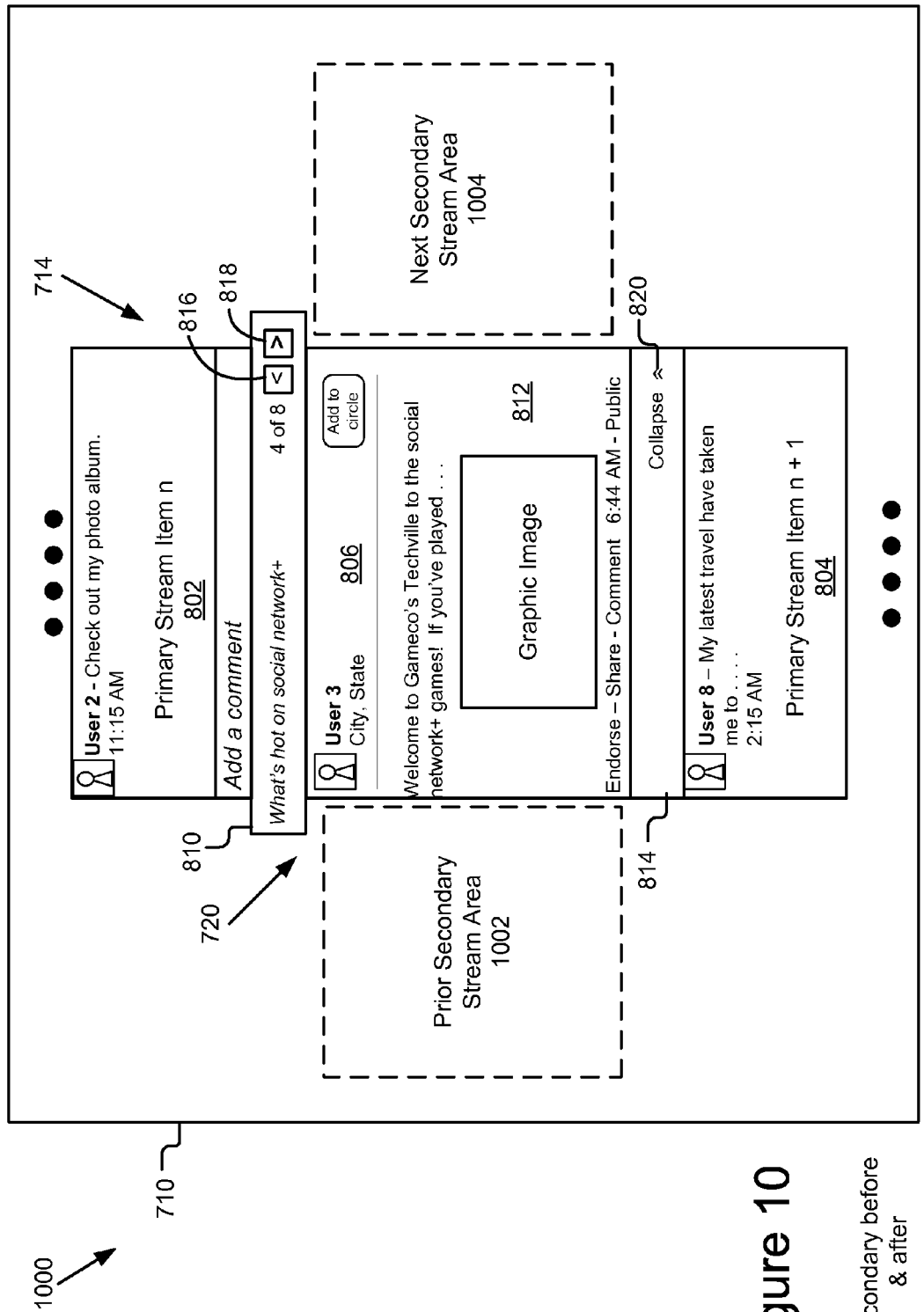
FIG. 10 is a graphic representation of a fourth embodiment of a user interface generated by the user interface engine of the present disclosure.

Referring now to FIG. 10, a fourth embodiment of a user interface 1000 generated by the user interface engine 260 of the present disclosure is described. FIG. 10 shows a partial view of the fourth embodiment of the user interface 1000 focusing on the display area 710 that presents the primary stream 714 and the embedded or secondary stream 720. Like reference numerals are used to refer to like components that have the same or similar functionality to that described above with reference to FIGS. 7, 8 and 9. FIG. 10 shows the user interface 1000 that includes a preview of additional content items from the secondary stream 720. The user interface 1000 includes the primary stream 714 and the secondary stream 720 and presents those streams in a manner similar to that described above with reference to FIG. 8. However, the user interface 1000 also includes two additional preview areas 1002, 1004. In some embodiments, the preview areas 1002, 1004 are shown in a transparent, lightened or partially rendered state (e.g., show only a vertical half of the element). In other embodiments, there is only a single preview area, either the prior secondary stream area 1002 or the next secondary stream preview area 1004. It should be understood that the top rail 810 indicates the content item from the secondary stream 720 shown in the secondary stream display area 812. In this example, content item 4 of 8 is shown in the secondary stream display area 812. Thus extending this example, the prior secondary stream area 1002 would show item 3 of 8, and the next secondary stream area 1004 would show item 5 of 8. Moreover, it should be understood that as the user selects buttons 816 or 818; the secondary stream display area 812 and the preview areas 1002, 1004 are updated thus making it appear as if the content items of the secondary stream display area 812 shift left or right in response to selection of buttons 816 or 818. It should be understood that the transitions presented by the user interfaces of the present disclosure could also include animation to highlight changes in the primary or secondary streams 714, 720.

Figure 11A:
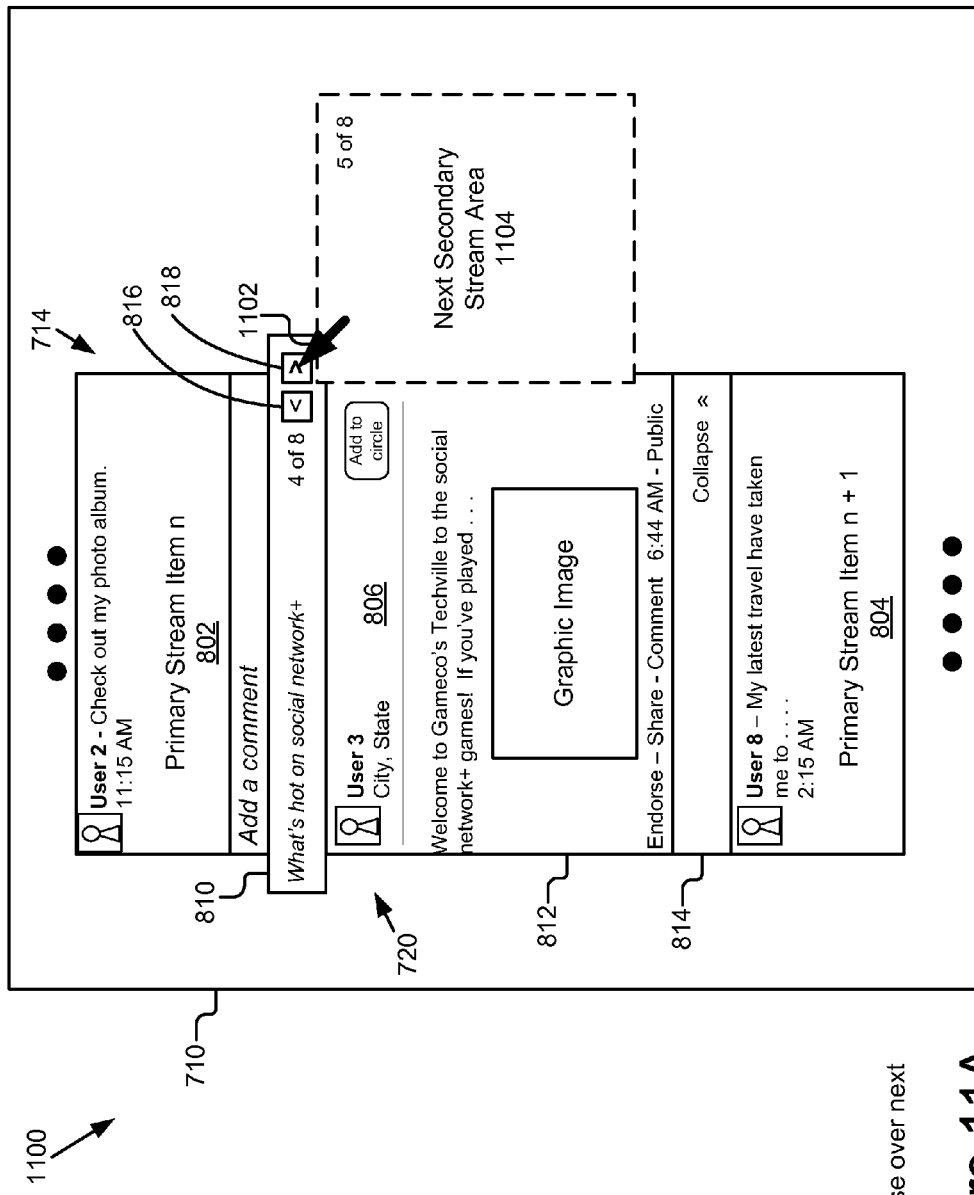
FIGS. 11A and 11B are graphic representations of a fifth embodiment of a user interface generated by the user interface engine of the present disclosure.
Figure 11B:
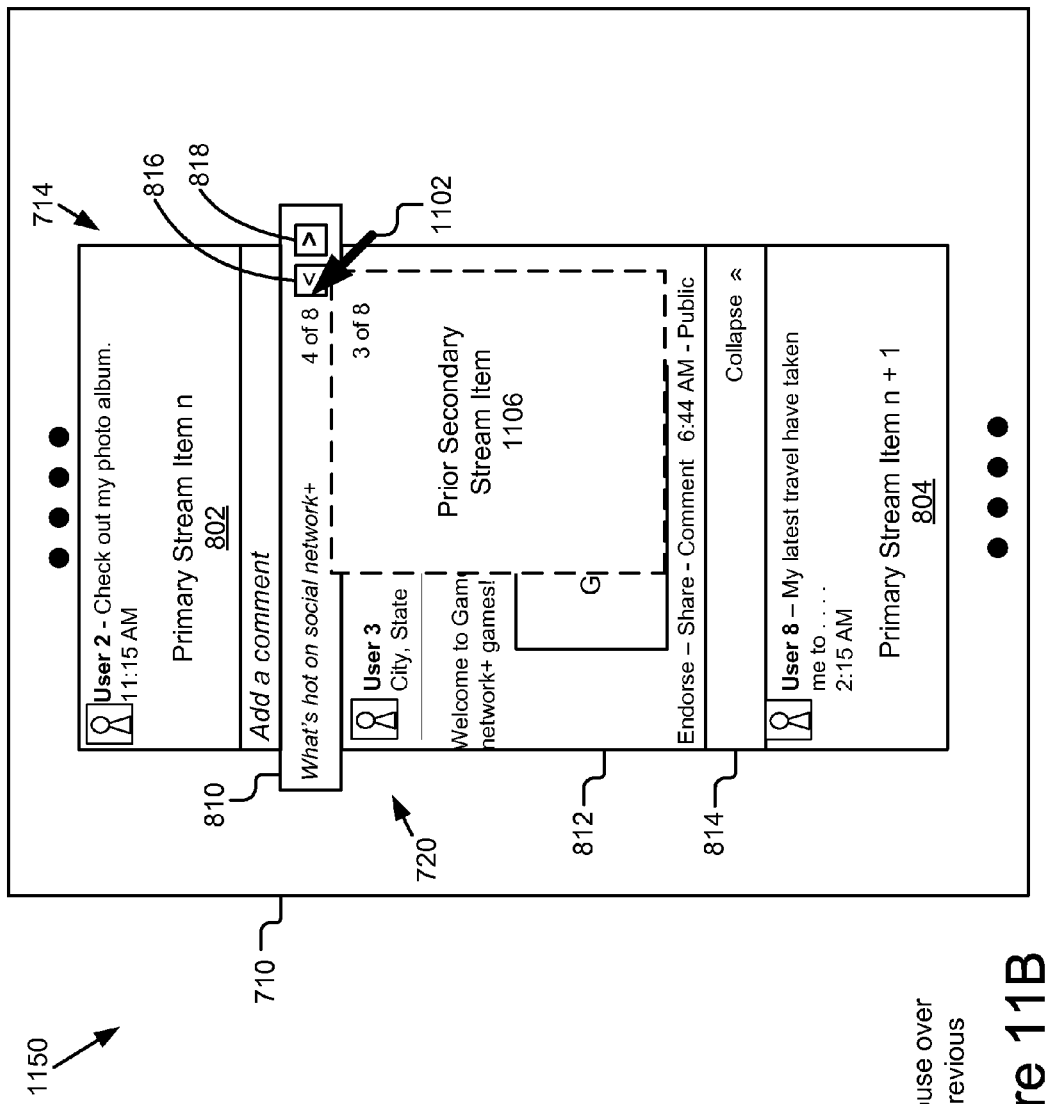

Referring now to FIGS. 11A and 11B, a fifth embodiment of a user interface 1100, 1150 generated by the user interface engine 260 of the present disclosure is described. FIGS. 11A and 11B shows a partial view of the fifth embodiment of the user interface 1100, 1150 focusing on the display area 710 that presents the primary stream 714 and the embedded or secondary stream 720. Like reference numerals are used to refer to like components that have the same or similar functionality to that described above with reference to FIGS. 7 and 8. FIGS. 11A and 11B shows the user interface 1100, 1150 that is updated based upon position of a cursor 1102. The user interface 800 of FIG. 8 is presented to the user to display a primary stream 714 with the secondary stream 720 embedded in the primary stream 714. The user interacts with the user interface 800 including by manipulating the cursor 1102 over the user interface 800 to select any number of buttons, links, or other selectable user interface components such as scrollbars, menus, etc. FIG. 11A shows the user interface 1100 once the user interface engine 260 detects that the user has positioned the cursor 1102 over the next button 818 of the secondary stream title rail 810. Upon detecting the cursor position, the user interface 1100 is updated to show the next secondary stream item in a next secondary stream area 1104. In one embodiment, the next secondary stream area 1104 is positioned proximate the next button 818. In other embodiments, the next secondary stream area 1104 is shown at a position similar to that of the next secondary stream area 1002 of FIG. 10. Regardless of the position, the secondary stream area 1104 can be shown with transparency or in any other visually distinct manner to convey to the user the content of the next item in the secondary stream 720 while minimizing the intrusiveness of the presentation of that information to the presentation of the primary stream 714.

In a like manner, FIG. 11 B shows the user interface 1150 once the user interface engine 260 detects that the user has positioned the cursor 1102 over the previous button 816 of the secondary stream title rail 810. Upon detecting the cursor position, the user interface 1150 is updated to show the previous secondary stream item in a previous secondary stream area 1106. In one embodiment, the previous secondary stream area 1106 is positioned proximate the previous button 816 as shown in FIG. 11B. In other embodiments, the previous secondary stream area 1106 is shown at a position similar to that of the prior secondary stream area 1002 of FIG. 10. Regardless of the position, the secondary stream area 1106 can also be shown with transparency or in any other visually distinct manner to convey to the user the content of the previous context item of the secondary stream.

Systems and methods for providing or presenting secondary or embedded streams have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of a social network server; however, the disclosed technologies apply to other data sources and other data types (e.g., collections of other resources such as images, audio, web pages) that detect and extend user engagement with content.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with nonvolatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present disclosure can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method for generating a user interface with an embedded stream, the method comprising:
    determining, by one or more hardware-processors, a context of a first user's interaction with a stream of content;
    determining, by the one or more hardware-processors, content for a primary stream of content associated with the first user;
    determining, by the one or more hardware-processors, content for a secondary stream of content associated with the first user, the secondary stream including additional information about a content item in the primary stream of content associated with the first user, the additional information being derived from a primary stream of content associated with a second user who is connected to the first user on a social graph;
    embedding, by the one or more-hardware-processors, the secondary stream into the primary stream associated with the first user; and
    providing, by the one or more hardware-processors, a user interface including the secondary stream embedded into the primary stream associated with the first user.

2. The method of claim 1, wherein the determining context of the first user's interaction with the stream includes receiving a request for the stream of content.

3. The method of claim 1, wherein determining content for the primary stream associated with the first user is performed by a scoring engine.

4. The method of claim 1, wherein determining content for the secondary stream associated with the first user includes retrieving content items that are socially relevant to the user from one or more connections in a social network.

5. The method of claim 1, wherein the step of determining content for the secondary stream of content associated with the first user includes determining content for a plurality of secondary streams, and the step of embedding embeds the plurality of secondary streams into the primary stream associated with the first user.

6. The method of claim 1, further comprising:
    receiving input from the first user;
    determining whether the received first user input relates to the secondary stream associated with the first user;
    modifying the embedded secondary stream of the user interface; and
    providing the modified user interface for display to the first user.

7. The method of claim 6, wherein the received first user input is a request for more information than previously determined for the secondary stream of content associated with the first user, and the method further comprises:
    determining an additional content item based upon the received first user input;
    retrieving the determined additional content item; and
    updating the user interface to include the additional content item.

8. The method of claim 6, wherein the received first user input is a cursor over a button for a next or a previous content item of the secondary stream.

9. The method of claim 6, wherein the received first user input is a request for less information than previously determined for the secondary stream, and the method further comprises:
    removing a secondary stream content item from the user interface;
    updating the user interface to include a marker representing the secondary stream, the marker including a title rail and a bottom rail.

10. A computer program product comprising a non-transitory computer usable medium including a computer readable program, wherein the computer readable program when executed on a computer causes the computer to:
    determine a context of a first user's interaction with a stream of content;
    determine content for a primary stream of content associated with the first user;
    determine content for a secondary stream of content the secondary stream associated with the first user, the secondary stream including additional information about a content item in the primary stream of content associated with the first user, the additional information being derived from a primary stream of content associated with a second user who is connected to the first user on a social graph;
    embed the secondary stream into the primary stream associated with the first user; and
    provide a user interface including the secondary stream embedded into the primary stream associated with the first user for display to the first user.

11. The computer program product of claim 10, wherein the computer readable program when executed on the computer causes the computer to also receive a request for the stream of content.

12. The computer program product of claim 10, wherein a scoring engine determines the content for the primary stream of content associated with the first user.

13. The computer program product of claim 10, wherein the computer readable program when executed on the computer causes the computer to also retrieve content items that are socially relevant to the user from one or more connections in a social network.

14. The computer program product of claim 10, wherein the computer readable program when executed on the computer causes the computer to also determines content for a plurality of secondary streams, and embed the plurality of secondary streams into the primary stream associated with the first user.

15. The computer program product of claim 10, wherein the computer readable program when executed on the computer causes the computer to also:
    receive input from the first user;
    determine whether the received first user input relates to the secondary stream associated with the first user;

modify the embedded secondary stream of the user interface; and provide the modified user interface for display to the first user.

16. The computer program product of claim 15, wherein the received first user input is a request for more information than previously determined for the secondary stream of content associated with the first user and the computer readable program when executed on the computer causes the computer to also:

determine an additional content item based upon the received first user input;

retrieve the determined additional content item; and update the user interface to include the additional content item.

17. The computer program product of claim 15, wherein the received first user input is a cursor over a button for a next or a previous content item of the secondary stream.

18. The computer program product of claim 15, wherein the received first user input is a request for less information than previously determined for the secondary stream, and the computer readable program when executed on the computer causes the computer to also:

remove a secondary stream content item from the user interface;

update the user interface to include a marker representing the secondary stream, the marker including a title rail and a bottom rail.

19. A system for providing a user interface with a secondary stream of content embedded into a primary stream of content, the system comprising:

one or more hardware processors;

a contextual module stored on a memory and executable by the one or more hardware processors for determining a context of a first user's interaction with a stream of content;

a primary stream generator stored on a memory and executable by the one or more hardware processors for generating the primary stream of content for the first user, the primary stream generator coupled to a content source to extract data and coupled to provide the primary stream of content associated with the first user;

a secondary stream generator stored on the memory and executable by the one or more hardware processors for generating the secondary stream of content for the first user, the secondary stream generator coupled to the content source to retrieve data and coupled to provide the secondary stream of content associated with the first user, the secondary stream including additional information about a content item in the primary stream of content associated with the first user, the additional information being derived from a primary stream of content associated with a second user who is connected to the first user on a social graph;

a user interface engine stored on the memory and executable by the one or more hardware processors for producing a user interface including the secondary stream embedded into the primary stream of content associated with the first user, the user interface engine coupled to receive the primary stream associated with the first user from the primary stream generator and the secondary stream associated with the first user from the secondary stream generator.

20. The system of claim 19, further comprising a scoring engine for providing content from a social network, the scoring engine coupled to provide content to the primary stream generator and the secondary stream generator.

21. The system of claim 19, wherein the secondary stream generator generates the secondary stream based upon a content item in the primary stream of content associated with the first user.

22. The system of claim 19, wherein secondary stream generator generates a plurality of secondary streams for the primary stream associated with the first user, and the user interface engine embeds the plurality of secondary streams at different positions in the primary stream associated with the first user.

23. The system of claim 19, wherein the user interface engine is coupled to receive input from the first user, determines whether input from the first user relates to the secondary stream and in response modifies the user interface and provides the modified user interface for display.

24. The system of claim 23, wherein user interface engine determines and retrieves an additional content item based upon input from the first user and updates the user interface to include the additional content item.

25. The system of claim 19, wherein the user interface includes a button for a next or a previous content item of the secondary stream.

26. The system of claim 19, wherein the user interface includes a collapse button and in response to selection of the collapse button, he user interface engine replaces the secondary stream content item with a marker.

* * * * *